April 11, 1950 O. A. SHANN 2,503,846

TELEPHONE SET

Filed Dec. 27, 1946

INVENTOR
O. A. SHANN
BY
Walter C. Kiesel
ATTORNEY

Patented Apr. 11, 1950 2,503,846

UNITED STATES PATENT OFFICE 2,503,846

TELEPHONE SET

Oscar A. Shann, Short Hills, N. J., assignor to Bell Telephone Laboratories, Incorporated, New York, N. Y., a corporation of New York Application December 27, 1946, Serial No. 718,641

11 Claims. (Cl. 179—156)

This invention relates to telephone sets and more particularly to handsets and means for supporting them.

One object of the invention is to enable a user of a handset type of telephone set to have free use of the hands when talking and listening.

Another object of the invention is to arrange a support for a hand telephone set so that it occupies a minimum of space, is easily adjustable to the head of a user and does not protrude from the boundary of that portion of the handle gripped by the hand of the user.

In accordance with one feature of the invention, a handle connecting a transmitter and a receiver of a handset is hollowed out to receive a head-band adapted to be telescoped into the handle.

In accordance with another feature of the invention, an auxiliary receiver is pivotally mounted on one end of the head-band whereby the over-all length of the device is shortened when the head-band is in its retracted position.

In accordance with still another feature of the invention, a switch is provided in the handle which is operable by withdrawal of the head-band from the handle, whereby the auxiliary receiver is connected in circuit with the handset receiver.

These and other aspects of the invention will be more clearly understood from the following detailed description when considered in connection with the accompanying drawing in which.

Figures 1, 2, 3, 4:
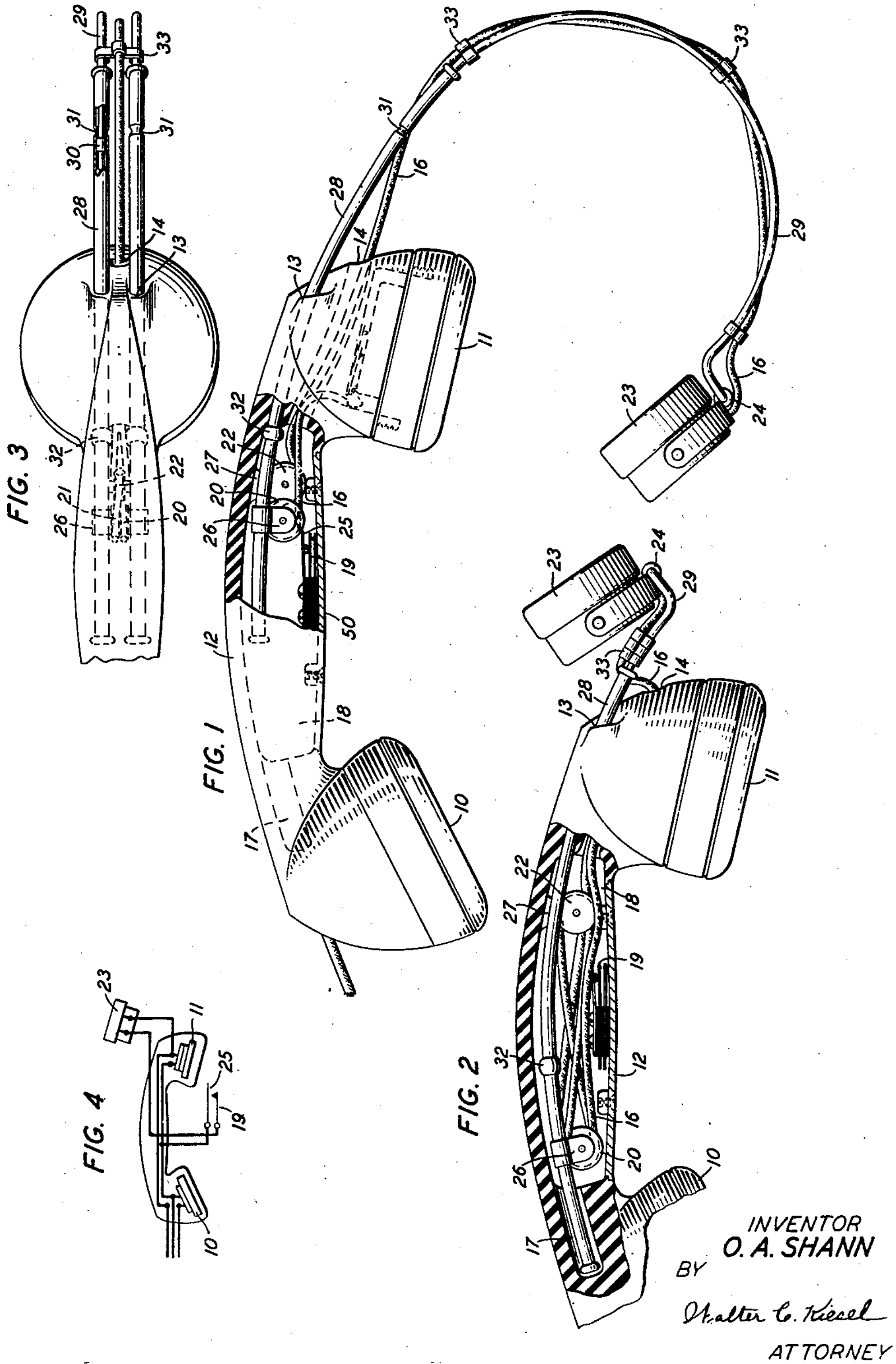
Fig. 1 is a side view of the device, partly in section, showing the handset with the head-band extended and the auxiliary receiver mounted on one end of the head-band.
Fig. 2 is a partial side view of the handset, shown in Fig. 1, partly in section, with the head-band in its retracted position and with the auxiliary receiver in its normal position.
Fig. 3 is a top view of a portion of the handset and head-band showing in detail the means for supporting sections of the head-band in the handle and details of the head-band.
Fig. 4 shows the circuit of the handset and of the auxiliary receiver when the head-band is in retracted position.

Referring to Fig. 1, a lightweight handset having a transmitter portion 10, a receiver portion 11, and a hollow handle portion 12 is provided with openings 13 and 14 to receive respectively the head-band elements 28 and 29 and two conductors in cord 16. Within said handle portion 12 is a cavity 17 to receive head-band elements 28 and a second and deeper cavity 18 in which switch 19, part of head-band elements 28, stationary pulley 22 and movable pulleys 20 and 21 mounted on the head-band are contained. The portion of the handle 50, in which the switch 19 is mounted, is removable and secured to the main portion 12 of the handle in any suitable manner.

The cord 16, leading to auxiliary receiver 23, rides over pulleys 20, 21 and 22 so as to compel retraction of cord 16, into cavity 18 when the telephone is to be used as a handset; this is done in one arrangement, by mounting cord 16 through the opening 14 around movable pulley 20 to stationary pulley 22 back to movable pulley 21 and connecting one wire in the cord to receiver 11 and the other to switch 19 as shown in Fig. 4. When the head-band and auxiliary receiver are not in use, the head-band elements 28 are pushed into the handle portion 12; pulleys 20 and 21 are carried back on head-band elements 28 to the end of cavity 18, drawing cable 16 through opening 14 and into the cavity.

Fig. 2 shows the invention in condition for use as a handset with auxiliary receiver 23 out of the circuit and folded back on hinge 24. The opening of the circuit to the auxiliary receiver occurs when the pulleys 20 and 21 are pushed back into cavity 18 and release pressure on spring contact 25 of switch 19.

Fig. 3 shows the pulleys 20 and 21 attached to the two arms 28 of the head-band by a double frame 26 which also maintains the spacing of said arms; pulley 22 is held on frame 27, which is suitably attached to handle portion 12. The end details of tubular elements 28 and a portion of the telescoping spring wire continuation 29 of the head-band are also shown. The outward pull of wire 29 is prevented by sleeve 30 on wire 29. At the limit of extension sleeve 30 rides up against the indentation 31 near the end of tube 28 and sleeve 32 on tube 28 limits its extension out of handle 12. The head-band is also provided with clips 33 which embrace the cord 16 and the head-band elements 28 and 29 thus holding the cord between said elements.

The head-band is formed of material sufficiently resilient to clamp firmly over the head of the user and the telescoping action permits adjustment as desired to properly fit the head so that the auxiliary receiver will be firmly seated against the ear of the wearer. The device is readily put on or taken off, when not in use it is easily enclosed for the most part in the handset, and the usual telephone circuit is restored without the special attention of the user.

To put the device in service, the user merely pulls the head-band out of the handle of the handset; the pulleys 20 and 21 are carried to the upper part of the cavity 18, ride upon spring contact 25 forcing it closed, and allow the cord 16 to be pulled out opening 14. The circuit to the auxiliary receiver is thus closed and the receiver is in position to be swung down to seat against the ear.

The foregoing detailed description sets forth the invention in its preferred practical form; however, I do not desire to limit myself to the specific construction illustrated but intend to cover my invention broadly in whatever form its principle may be utilized.

What is claimed is:

1. A telephone set comprising a hollow handle, a receiver and a transmitter mounted upon said handle, and a head-band fitted into said handle and longitudinally slidable therein.

2. A telephone set comprising a hollow handle, a receiver and a transmitter mounted upon said handle, and a head-band telescopically fitted into said handle.

3. A telephone set in accordance with claim 1 comprising an auxiliary receiver in circuit with said first receiver and mounted on said head-band.

4. A telephone set comprising a hollow handle, a receiver and a transmitter mounted upon said handle, a head-band fitted telescopically into said handle, an auxiliary receiver mounted on said head-band, a cord connecting said auxiliary receiver in circuit with said receiver, and means for limiting the slack in the cord between said first receiver and said auxiliary receiver, said means comprising a pulley secured to said handle and a pulley secured on the head-band, said pulleys carrying said cord.

5. A telephone set comprising a hollow handle, a receiver and a transmitter mounted upon said handle, a head-band fitted telescopically into said handle, an auxiliary receiver mounted upon said head-band, a switch within said handle to connect said auxiliary receiver in circuit with said first receiver, a cord connecting said auxiliary receiver to said first receiver and said switch and pulleys carried on said head-band on which the cord to said auxiliary receiver is mounted within said handle, said switch being closed by said pulleys when the head-band is extended to its operative position.

6. A telephone comprising handset having a hollow handle, a head-band comprising telescopic sections adapted to fit into said handle, an auxiliary receiver mounted on one end of said head-band, a switch for electrically associating said auxiliary receiver with a receiver of said handset, and means associated with said head-band serving to actuate said switch when said head-band is extended for use.

7. A telephone set comprising a handset having a handle and a support therefor, said support being telescopically fitted into one end of said handle.

8. A telephone set comprising a handset having a hollow handle, said set having a pair of openings in one end thereof connecting with the hollow portion of said handle, and a support for said set comprising a pair of members slidably arranged in frictional engagement with the walls of said openings and extending into said hollow portion of said handle and resilient members telescopically fitted into said first mentioned members.

9. A telephone set comprising a hollow handle, a receiver and a transmitter mounted upon said handle, and a head-band housed within said handle and adjustably extendible outwardly from said handle.

10. A telephone comprising a hollow handle, a receiver and transmitter mounted upon said handle, a cord conductor in circuit with said receiver and transmitter and extending from said handle, and means within said handle for taking up and housing said cord.

11. A telephone comprising a handset having a hollow handle, a support fitted into said handle and arranged to be housed therein, an auxiliary receiver mounted on said support, a cord connecting said auxiliary receiver in circuit with said first receiver, and means for limiting the slack in the cord between said first receiver and said auxiliary receiver.

OSCAR A. SHANN.

REFERENCES CITED

The following references are of record in the file of this patent:

UNITED STATES PATENTS

| Number | Name | Date |
|---|---|---|
| 2,360,027 | Werner | Oct. 10, 1944 |
| 2,408,720 | Alger | Oct. 8, 1946 |

FOREIGN PATENTS

| Number | Country | Date |
|---|---|---|
| 520,468 | Germany | Mar. 11, 1931 |